United States Patent Office 3,579,588
Patented May 18, 1971

3,579,588
6,6,7,7-TETRACHLOROBICYCLO(3.2.0)
HEPTAN-2-ONE
Wendell L. Dilling, Midland, Mich., assignor to The Dow Chemical Company, Midland, Mich.
No Drawing. Filed July 24, 1968, Ser. No. 747,116
Int. Cl. C07c 49/00; B01j 1/10
U.S. Cl. 260—586     1 Claim

ABSTRACT OF THE DISCLOSURE

The present disclosure is directed to the compound 6,6,7,7-tetrachlorobicyclo(3.2.0)heptan-2-one, its method of preparation as well as its use as a bactericide and fungicide.

SUMMARY OF THE INVENTION

The present invention relates to a novel and useful bicycloheptan-2-one derivative. It is more particularly concerned with the new compound 6,6,7,7-tetrachlorobicyclo(3.2.0)heptan-2-one. This compound can be represented by the formula:

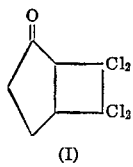

(I)

The compound of the present invention is a white crystalline solid, having low solubility in water and soluble to a great degree in organic solvents such as acetone and benzene.

The compound of the present invention is very useful for the control of a wide variety of pests such as the bacteria and fungal organisms *Staphylococcus aureus, Bacillus subtilis, Pseudomonas aeruginosa, Candida pelliculosa, Pullularia pullulans, Salmonella typhosa, Rhizopus nigricans, Aspergillus terreus* and *Aerobacter aerogenes*.

The 6,6,7,7 - tetrachlorobicyclo(3.2.0)heptan-2-one of the invention may be prepared by the irradiation of 2-cyclopentenone and perchloroethylene in a nitrogen atmosphere. This reaction can be represented as follows:

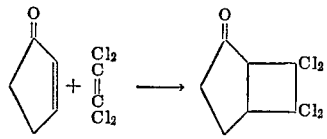

In carrying out this reaction, the 2-cyclopentenone is dissolved in the perchloroethylene and is then deoxygenated by passing a stream of nitrogen gas or other inert gas therethrough. The addition is allowed to proceed to completion at a temperature at which the reaction is liquid, preferably between 20° and 50° C. The reaction is carried out while exposing the reaction zone to actinic radiation and while the zone is under a nitrogen or other inert gas atmosphere. The reaction time varies with the intensity of the radiation and may be as long as thirteen days. The excess perchloroethylene is removed by distillation and the product may be recovered by a further distillation step. Further purification of the product may be obtained by conventional crystallization procedures.

The irradiation of the reaction mixture should be carried out with light sources having wavelengths of from 2000 to 3800 angstroms, and preferably from about 2800 to 3700 angstroms.

DESCRIPTION OF SOME PREFERRED EMBODIMENTS

The following example illustrates the present invention and the manner by which it can be practiced but, as such, should not be construed as a limitation upon the overall scope of the same.

Example.—6,6,7,7-tetrachlorobicyclo(3.2.0)heptan-2-one

A solution is prepared by dissolving 1.0 gram of 2-cyclopentenone in 135 milliliters of perchloroethylene. This solution is then deoxygenated by passing a stream of nitrogen gas through it for a period of one-half (½) hour. The reaction is then carried out by subjecting the reactants to irradiation from a 450-watt Hanovia medium pressure mercury arc lamp, type 679A, through a Pyrex glass well, while under a nitrogen atmosphere and at a temperature of 20°–25° C. During the course of the reaction, an additional 4.0 grams of 2-cyclopentenone are added and reacted in 1.0 gram increments. The reaction is complete in thirteen days, the excess perchloroethylene is removed by distillation and the product is isolated by an additional distillation step. The 6,6,7,7-tetrachlorobicyclo(3.2.0)heptan-2-one is recovered as a solid crystalline product by crystallization from methanol and is obtained in a yield of 6.0 grams (40 percent). The product has a molecular weight of 246 and a melting point of 39.5°–40° C. The product is found by analysis to have carbon, hydrogen and chlorine contents of 33.80, 2.53 and 57.28 percent, respectively, as compared with the theoretical contents of 33.91, 2.44 and 57.20 percent, respectively, calculated for the named structure.

The compound of the invention is employed as a toxicant in pesticides for the control of bacteria and fungal organisms. For such uses, the compound can be employed in an unmodified form or dispersed on a finely divided solid and employed as a dust. Such mixtures can also be dispersed in water with or without the aid of a surface active agent and the resulting aqueous suspension employed as a spray. In other procedures, the product can be employed as the active constituent in solvent solutions, oil in-water or water-in-oil emulsions or aqueous dispersions. The augmented compositions are adapted to be formulated as concentrates and subsequently diluted with additional liquid or solid adjuvants to produce the ultimate treating compositions. Good results are obtained when employing compositions containing pesticidal concentrations, and usually from about 1 to 10,000 parts by weight of the compound per million parts of such composition.

In a representative operation, the compound of the present invention was tested for its activity for the control of bacterial and fungal organisms. A suspension containing 6,6,7,7-tetrachlorobicyclo(3.2.0)heptan - 2 - one was prepared by adding the compound to isopropanol and then diluting the mixture to a concentration of about 500 parts by weight of active compound per million parts of warm melted nutrient agar. The resultant treated nutrient was poured into petri dishes and allowed to solidify. The compound of the invention was the sole toxicant in the treated nutrient. Check dishes were also prepared from the nutrient agar containing none of the toxicant. Droplets of representative organism cultures were applied to the agar surface in each petri dish. The inoculated nutrient agar cultures were then incubated for about 48 hours under conditions conductive to the growth of the test organisms. In such operation, the compound of the invention was found to give 100 percent kill and control of the bacterial organisms *Aerobacter aerogenes, Bacillus subtilis, Pseudomonas aeruginosa, Salmonella typhosa* and *Staphylococcus aureus* and the fungal organisms *Pullularia pullulans, Candida pelliculosa, Aspergillus terreus* and *Rhizopus nigricans*. In each of the above determinations, the check nutrient agar supported a heavy growth of the test organisms.

PREPARATION OF STARTING MATERIALS

The perchloroethylene starting material is a commercial product and may be prepared by the reaction of 2 moles of carbon tetrachloride with 2 moles of iron. This compound may also be obtained as a byproduct from the manufacture of chloroform from carbon tetrachloride.

The preparation of the perchloroethylene is further described in "The Chemistry of Organic Compounds," J. B. Conant (1936), The Macmillan Company.

The 2-cyclopentenone starting material is also a commercial product and may be prepared by heat reduction of the calcium salt of 2-butene-1,4-dicarboxylic acid.

What is claimed is:
1. 6,6,7,7-tetrachlorobicyclo(3.2.0)heptan-2-one.

References Cited

UNITED STATES PATENTS 3,420,886   1/1969   Dilling _____ 260—586

OTHER REFERENCES

Braendlin et al.: "J. Am. Chem. Soc.," vol. 84, pp. 2112–2115, 1962.

BERNARD HELFIN, Primary Examiner

N. P. MORGENSTERN, Assistant Examiner

U.S. Cl. X.R.

260—999; 204—158